(12) United States Patent
Nagamine et al.

(10) Patent No.: US 8,305,204 B2
(45) Date of Patent: Nov. 6, 2012

(54) VEHICLE SURROUNDING CONFIRMATION APPARATUS

(75) Inventors: Noboru Nagamine, Anjo (JP); Kazuya Watanabe, Anjo (JP); Takeshi Naito, Toyota (JP); Tadashi Asano, Gifu (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 526 days.

(21) Appl. No.: 12/628,524

(22) Filed: Dec. 1, 2009

(65) Prior Publication Data

US 2010/0134264 A1 Jun. 3, 2010

(30) Foreign Application Priority Data

Dec. 1, 2008 (JP) .................................. 2008-306612

(51) Int. Cl.
*B60Q 1/00* (2006.01)
(52) U.S. Cl. ...................... 340/435; 430/436; 430/932.2; 348/113; 348/148; 348/118; 382/190; 382/103; 382/104; 701/301
(58) Field of Classification Search .................. 340/435, 340/436, 932.2, 901; 348/113, 148, 118; 382/190, 103, 104; 701/301, 1; 700/62
See application file for complete search history.

(56) References Cited

FOREIGN PATENT DOCUMENTS

| JP | 2003-143596 A | 5/2003 |
|----|---------------|--------|
| JP | 2003-212041 A | 7/2003 |

*Primary Examiner* — Jennifer Mehmood
*Assistant Examiner* — Hongmin Fan
(74) *Attorney, Agent, or Firm* — Sughrue Mion, PLLC

(57) ABSTRACT

According to an aspect of this disclosure, a vehicle surrounding confirmation apparatus includes a narrow-field-of-view image generating portion generating a narrow-field-of-view image, showing a portion of a vehicle surrounding, from a captured image of the vehicle surrounding obtained by an image capturing portion, an obstacle recognizing portion recognizing an obstacle existing at the vehicle surrounding, a determining portion determining whether or not the obstacle, recognized by the obstacle recognizing portion, is included within the narrow-field-of-view image, an obstacle image extracting portion extracting an area, in which an image of the obstacle is shown, from the captured image as an obstacle image, when the obstacle, recognized by the obstacle recognizing portion, is not determined to be included within the narrow-field-of-view image, and a display image generating portion generating a display image from the narrow-field-of-view image and the obstacle image, thereby outputting the generated display image to a monitor.

13 Claims, 6 Drawing Sheets

000# VEHICLE SURROUNDING CONFIRMATION APPARATUS

CROSS REFERENCE TO RELATED APPLICATIONS

This application is based on and claims priority under 35 U.S.C. §119 to Japanese Patent Application 2008-306612, filed on Dec. 1, 2008, the entire content of which is incorporated herein by reference.

TECHNICAL FIELD

This disclosure relates to a vehicle surrounding confirmation apparatus for confirming an obstacle existing at a vehicle surrounding, using a captured image of the vehicle surrounding, obtained by an image capturing portion.

BACKGROUND DISCUSSION

JP2003-143596A discloses a monitor device for a vehicle having a camera, an image extracting means, a display means and an obstacle detecting means. The camera is mounted on the vehicle. The camera includes a wide-angle lens for capturing wide-field-of-view images of a vehicle surrounding. The image extracting means extracts an image of a predetermined range from the images captured by the camera through the wide angle lens. The display means displays the image extracted by the image extracting means. The obstacle detecting means detects obstacle existing at the vehicle surrounding. Further, an image, which shows an orientation of the obstacle, recognized by the obstacle recognizing portion, is extracted and then displayed on a display portion in an enlarged manner. More specifically, normally, the entire image, which is captured by the camera, an image, in which a lower-central portion of the captured image is extracted, an image, in which a lower-right portion of the captured image is extracted, and an image, in which a lower-left portion of the captured image is extracted, are alternately displayed for a predetermined time frame, in a repetitive manner. When the obstacle is detected by a backsonar, arranged at a right side of the vehicle, an image of a left-side predetermined range is extracted from the captured image memorized in an image memory (the camera is arranged to face a rear of the vehicle, and therefore, the obstacle, positioned at a rear-right side of the vehicle is shown at a left side of the captured image), then the extracted image is enlarged to fill an entire display screen, thereby being displayed on the display screen. When the obstacle is detected by another back sonar, arranged at a left side of the vehicle, an image of a right-side predetermined range is extracted from the captured image, then the extracted image is enlarged to fill the entire display screen, thereby being displayed on the display screen. An auxiliary screen may be provided at a predetermined portion of the display screen (for example, at an upper-right portion of the display screen) in order to display a position of the vehicle and a captured range of the extracted image therein. According to the monitor device for the vehicle, however, a portion of an image showing the detected obstacle is extracted from the captured image used for monitor display, and then displayed on the monitor in an enlarged manner. Therefore, when the obstacle is not included within the captured image being displayed on the monitor, the image of the obstacle may not be displayed. Further, when a capturing field of view is enlarged in order to avoid the aforementioned drawback, a substantially central range of the captured image, which normally includes important information, becomes small relative to a dimensions of the monitor display. Consequently, it may become difficult to confirm the vehicle surroundings through the image displayed on the monitor.

JP2003-212041A discloses a vehicle rear display device having a wide-angle camera at a lower-rear portion of a vehicle, and a narrow-angle camera at an upper-rear portion of the vehicle. According to the vehicle rear display device, when parking the vehicle rearward, a vehicle condition detecting device detects a vehicle condition based on a moving amount of the vehicle, a vehicle speed, a brake depressing amount and the like. Then, a display switching device switches display images appropriately according to the detected vehicle condition, so that, for example, a wide-field-of-view image, captured by the wide-angle camera, is displayed in order to display the rear of the vehicle during a first half of a rearward parking process and that a narrow-field-of-view image captured by the narrow-angle camera is displayed in order to display the rear of the vehicle during a second half of the rearward parking process. According to the vehicle rear display device, each of a field of view for capturing the wide-field-of-view image and a field of view for capturing the narrow-field-of-view image may be set individually. However, cost may be increased because two cameras are provided. Further, capturing angles of each of the cameras are different. Therefore, the wide-field-of-view image and the narrow-field-of-view image are captured from different angles. Accordingly, when the display images are switched from the wide-field-of-view image to the narrow-field-of-view image, a driver may be confused due to visual strangeness.

A need thus exists for a vehicle surrounding confirmation apparatus, which is not susceptible to the drawback mentioned above.

SUMMARY

According to an aspect of this disclosure, a vehicle surrounding confirmation apparatus includes a narrow-field-of-view image generating portion generating a narrow-field-of-view image, showing a portion of a vehicle surrounding, from a captured image of the vehicle surrounding obtained by an image capturing portion, an obstacle recognizing portion recognizing an obstacle existing at the vehicle surrounding, a determining portion determining whether or not the obstacle, recognized by the obstacle recognizing portion, is included within the narrow-field-of-view image, an obstacle image extracting portion extracting an area, in which an image of the obstacle is shown, from the captured image as an obstacle image, when the obstacle, recognized by the obstacle recognizing portion, is not determined to be included within the narrow-field-of-view image, based on a determination result of the determining portion, and a display image generating portion generating a display image from the narrow-field-of-view image and the obstacle image, thereby outputting the generated display image to a monitor.

According to a further aspect of this disclosure, A vehicle surrounding confirmation apparatus includes a narrow-field-of-view image generating portion generating a narrow-field-of-view image, showing a portion of a vehicle surrounding, from a captured image of the vehicle surrounding obtained by an image capturing portion, an obstacle recognizing portion recognizing an obstacle existing at the vehicle surrounding, a determining portion determining whether or not the obstacle, recognized by the obstacle recognizing portion, is included within the narrow-field-of-view image, an obstacle image extracting portion extracting an area, in which an image of the obstacle is shown, from the captured image as an obstacle image, when the obstacle, recognized by the obstacle recognizing portion, is not determined to be included within the narrow-field-of-view image, based on a determination result of the determining portion, and a display image generating portion generating a display image, thereby outputting the generated display image, to a monitor. The display image generating portion generates the display image from the obstacle image, thereby outputting the generated display image to the monitor, when the obstacle, recognized by the obstacle recognizing portion, is not determined to be included within the narrow-field-of-view image, based on a determination result of the determining portion.

According to a further aspect of this disclosure, A vehicle surrounding confirmation apparatus includes a narrow-field-of-view image generating portion generating a narrow-field-of-view image, showing a portion of a vehicle surrounding, from a captured image of the vehicle surrounding obtained by an image capturing portion, an obstacle recognizing portion recognizing an obstacle existing at a portion of the vehicle surrounding and at an outside of an area of the narrow-field-of-view image, an obstacle image extracting portion extracting an area, in which an image of the obstacle is shown, from the captured image as an obstacle image, when the obstacle is recognized by the obstacle recognizing portion, and a display image generating portion generating a display image from the narrow-field-of-view image and the obstacle image, thereby outputting the generated display image to a monitor.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
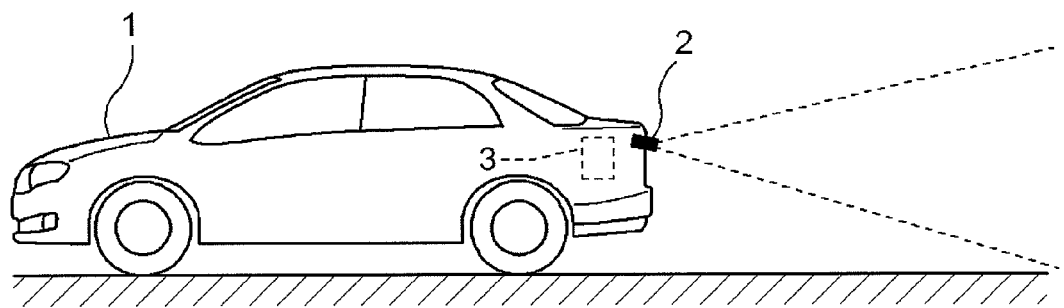
FIG. 1 is schematic view illustrating an appearance of a passenger vehicle having a vehicle surrounding confirmation apparatus.

An embodiment of the vehicle surrounding confirmation apparatus will be explained hereinafter with reference to the attached drawings. As illustrated in FIG. 1, a camera (an image capturing portion) 2 is provided at a vehicle 1 (a passenger vehicle according to the embodiment). The camera 2 captures images of a surrounding of the vehicle 1. The vehicle surrounding confirmation apparatus uses the images captured by the camera 2 in order to assist a driver to confirm circumstances of a vehicle surrounding. According to the embodiment, the camera 2 is arranged at a rear portion of the vehicle 1. Therefore, a capturing field of the camera 2 is set at a rear of the vehicle 1. The images captured by the camera 2 are processed by a vehicle surrounding confirming controller 3 (described later) so that the driver of the vehicle 1 may easily see the image, and then the processed image is displayed on a monitor 4, configured by a liquid crystal display and the like.

Figure 2:
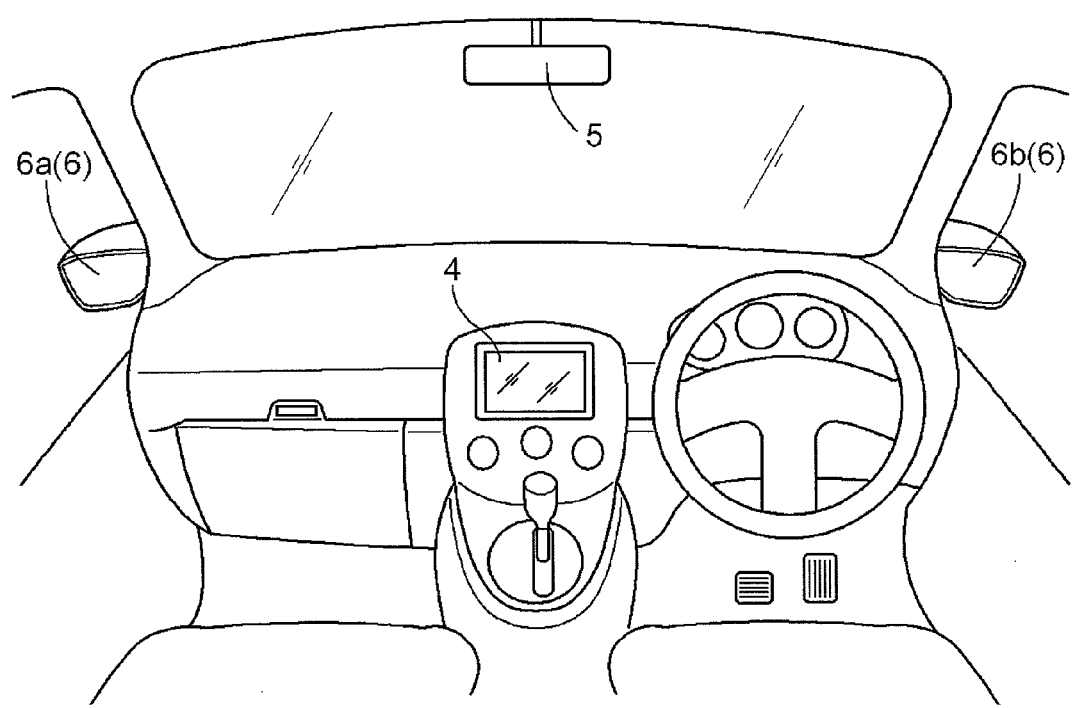
FIG. 2 is a schematic view illustrating an area of a driver's seat of the passenger vehicle having the vehicle surrounding confirmation apparatus.
Figure 3:
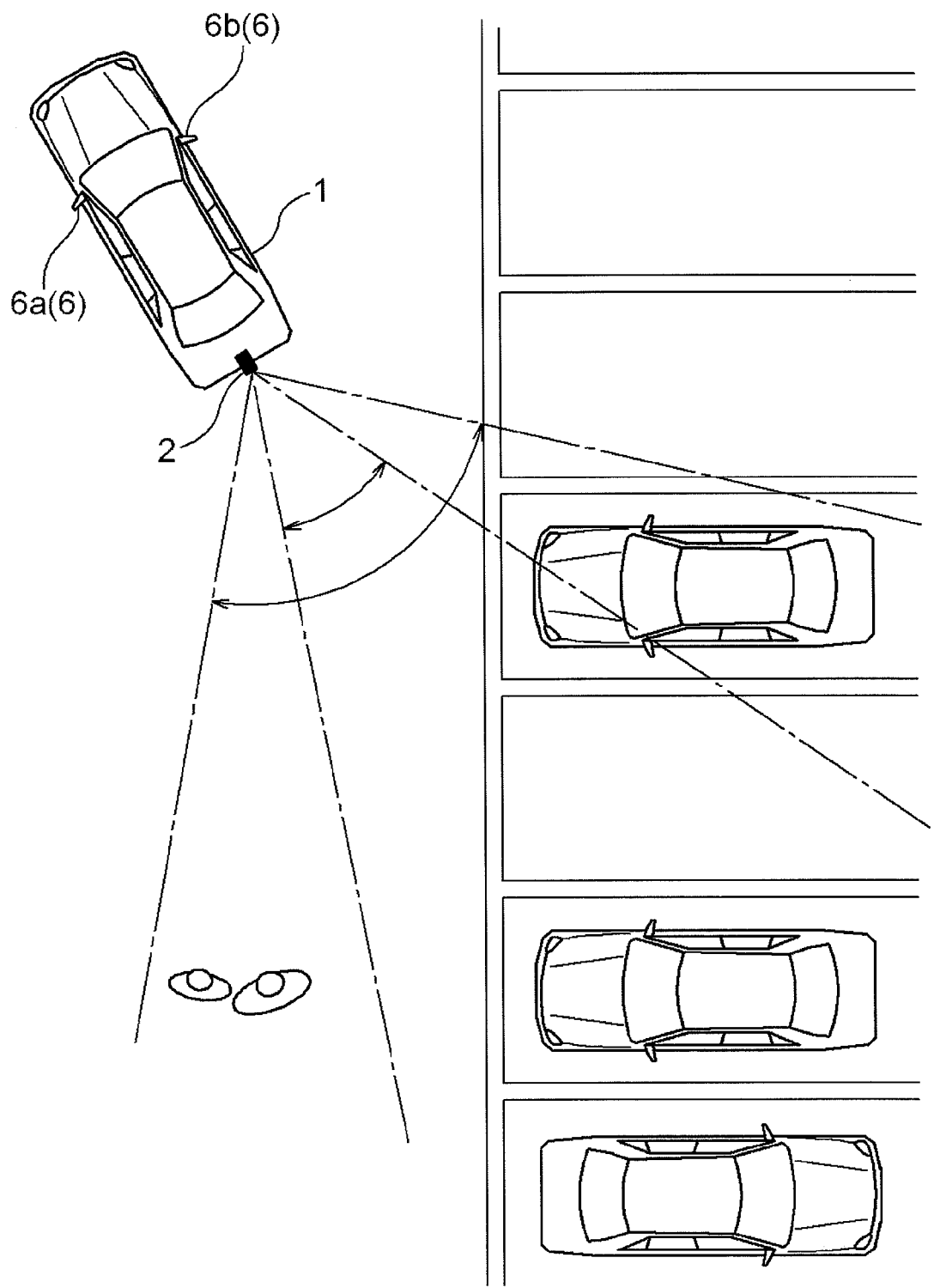
FIG. 3 is a bird's-eye view for explaining confirmation of a vehicle surrounding by means of the vehicle surrounding confirmation apparatus.

The camera 2 is a digital camera, embedded with an imaging element, such as a charge coupled device (CCD), a CMOS image sensor (CIS) and the like, and outputting information captured by the image sensor as a motion image information or a still image information in real time. A capturing angle of the camera 2 is set to be slightly downwardly. As illustrated in FIG. 2, the vehicle 1 includes a rear-view mirror 5 for confirming a rear-central area of the vehicle 1 and side mirrors 6 having a left-side mirror 6a for confirming a rear-left area of the vehicle 1 and a right-side mirror 6b for confirming a rear-right area of the vehicle 1. According to the embodiment, the camera 2 is attached with a wide angle lens whose field of view is 90 degrees or more, for example, approximately 140 degrees. Therefore, as illustrated in FIG. 3, the camera 2 captures wide-field-of-view images whose field of view is approximately 140 degrees. The field of view of the images captured by the camera 2 is set to be equal to or wider than a rear field of view of the driver seated on a driver's seat and confirming the rear of the vehicle, using the rear-view mirror 5 and the side mirrors 6. Alternatively, a fish-eye lens whose field of view is horizontally 180 degrees or more may be applied so as to capture images of an entire rear area of the vehicle 1. Further, a zoom lens may be applied so as to modify a field of view. Furthermore, a plurality of lenses may be used in a switching manner.

Figure 4:
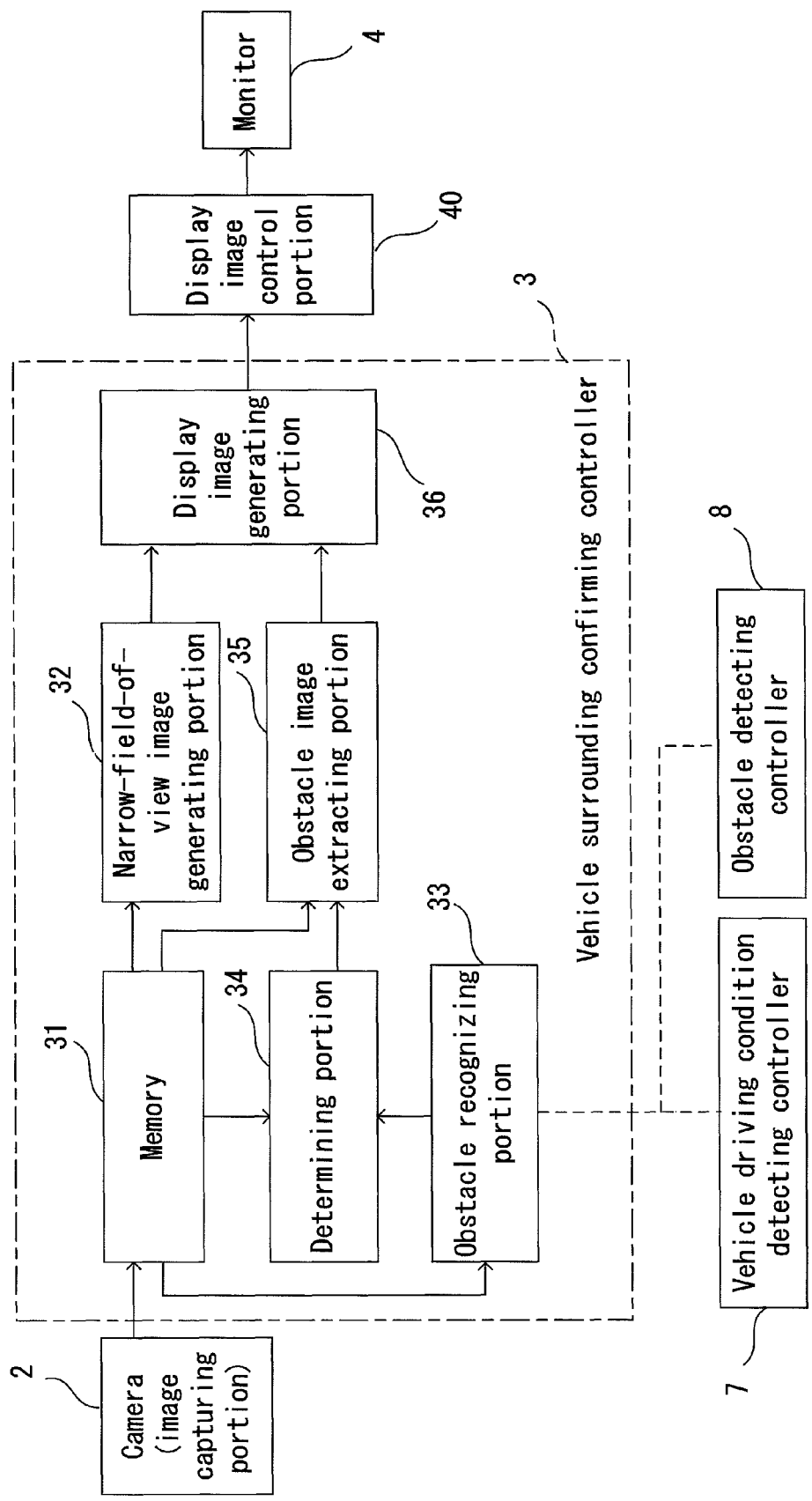
FIG. 4 is a function block diagram illustrating an example of the vehicle surrounding confirmation apparatus.

The vehicle surrounding confirming controller 3 is a computer unit having a central processing unit (CPU), which is referred to as an electronic control unit (ECU) and which serves as a core element. The vehicle surrounding confirming controller 3 executes programs, thereby performing plural kinds of functions. The vehicle surrounding confirming controller 3 includes plural kinds of functional portions, configured by programs and hardware. The functional portions process the captured wide-field-of-view images, which are transmitted from the camera 2 to be memorized in a memory 31, and then output display images, which the driver may easily see in order to confirm the rear of the vehicle. As illustrated in FIG. 4, the functional portions include a narrow-field-of-view image generating portion 32, an obstacle recognizing portion 33, a determining portion 34, an obstacle image extracting portion 35 and a display image generating portion 36.

Figure 5:
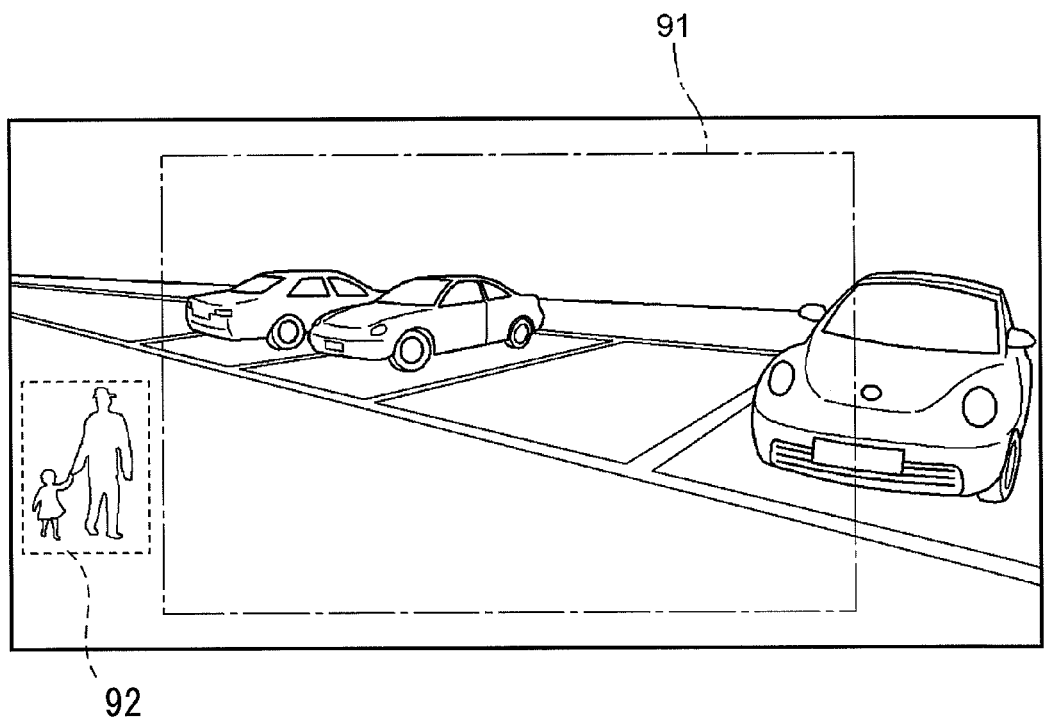
FIG. 5 is a schematic view illustrating a captured wide-field-of-view image.

FIG. 5 schematically illustrates the wide-field-of-view image captured by the camera 2 in a state shown by FIG. 3, and then memorized in the memory 31. The narrow-field-of-view image generating portion 32 partially extracts an image as the narrow-field-of-view image from the captured wide-field-of-view image of the vehicle surrounding, such as the rear view of the vehicle 1, using an extracting frame 91 (shown by an alternate long and short dash line in FIG. 5) having a predetermined coordinate position. As illustrated in FIG. 5, the partially extracted image (the narrow-field-of-view image) shows a central portion of the captured wide-field-of-view image. A field of view of the narrow-field-of-view image is narrower than that of the captured wide-fieldof-view image when the camera 2 is set as a viewing point. In a case where the wide-field-of-view image, captured by the camera 2, may be displayed on the relatively-small-sized monitor 4 for the vehicle 1, details may not be easily seen, and therefore circumstances of the rear of the vehicle 1 may not be easily confirmed. Therefore, according to the embodiment, a size of the extracting frame 91 is appropriately set based on the capturing field of view of the camera 2 and a display size of the monitor 4, and the narrow-field-of-view image, defined by such extracting frame 91, is displayed on the monitor 4. Therefore, the aforementioned drawback may not occur. Further, the narrow-field-of-view image, generated by the narrow-field-of-view image generating portion 32, shows a central area of the captured wide-field-of-view image. Therefore, when the vehicle 1 is driven rearward, for example, an area whose width corresponds to a width of the vehicle 1 and to which the vehicle 1 is approaching may be visually recognized surely. Accordingly, the rear of the vehicle 1 is easily confirmed when the vehicle 1 is normally driven rearward.

The obstacle recognizing portion 33 recognizes pedestrians, other vehicles and the like existing at the vehicle surrounding, as obstacles, which may obstruct a driving of the vehicle 1. A method, which the obstacle recognizing portion 33 applies in order to recognize the obstacle, is not limited to a specific method. However, according to the embodiment, a method is applied, in which the images, captured by the camera 2, are processed in order to recognize an obstacle. A plurality of images are captured sequentially at a predetermined time rate, and then stored in the memory 31. The plurality of captured images, which are captured at a predetermined small time interval, are compared, using an object detection algorithm, such as an optical flow method, a background differentiation method, a motion vector method and the like, and thereby a still object or a moving object may be recognized. Consequently, the obstacle recognizing portion 33 generates and then outputs obstacle information, including an outline and a position (i.e., accordingly, an orientation relative to the vehicle 1) of the obstacle existing on the captured image, and a moving direction (i.e., accordingly, an approaching direction relative to the vehicle 1) of the obstacle.

The vehicle 1 and the obstacle are moved relative to each other. Therefore, in order to calculate moving information of the obstacle (a moving vector) on the basis of an absolute position relative to the vehicle 1, moving information of the vehicle 1 is obtained by means of a vehicle driving condition detecting controller 7. The vehicle driving condition detecting controller 7 receives detection signals from sensor groups including a steering angle sensor, a shift position sensor, an accelerator position sensor, a brake sensor, a wheel rotation sensor and an orientation sensor, in order to calculate a moving amount and a position of the vehicle 1.

When a condition for image capturing is poor for example, at night or due to bad weather, the recognition of the obstacles from the captured images may be deteriorated. Therefore, an obstacle detecting controller 8, using a laser radar may be provided. In a case where the obstacle detecting controller 8 is provided, the obstacle recognizing portion 33 may include a function for recognizing obstacle based on obstacle detecting information transmitted from the obstacle detecting controller 8.

The determining portion 34 determines whether or not the obstacle, recognized by the obstacle recognizing portion 33, is included within the narrow-field-of-view image. In other words, the determining portion 34 determines whether or not the outline of the obstacle is at least partially positioned at an outside of the extracting frame 91, based on the obstacle information transmitted from the obstacle recognizing portion 33. As schematically illustrated in FIG. 5, in a case where the outline of the obstacle is at least partially positioned at the outside of the extracting frame 91, at least a partial obstacle image may not be included within the narrow-field-of-view image, which is generated by means of the narrow-field-of-view image generating portion 32, and then displayed on the monitor 4.

Therefore, according to the embodiment, when the obstacle is not determined to be included within the narrow-field-of-view image based on a determination result of the determining portion 34, the obstacle image extracting portion 35 extracts an area, in which the image of the obstacle is shown, as the obstacle image from the captured image memorized in the memory 31. The obstacle image is an image included in an area defined by an obstacle extracting frame 92 (shown by chain line in FIG. 5). The obstacle image, extracted by means of the obstacle image extracting portion 35, is displayed on the monitor 4 in a manner where the display image generating portion 36 controls the display of the obstacle image. As described above, the determining portion 34 includes a function for determining whether or not the obstacle is included within the narrow-field-of-view image. Alternatively, the obstacle recognizing portion 33 may be configured to recognize only the obstacle, which is arranged at an outside of the narrow-field-of-view image. In such a case, the function of the determining portion 34 may be included in the obstacle recognizing portion 33. Further, according to the embodiment, names, such as determining portion 34 and the obstacle recognizing portion 33, are used in order to express functions performed by the vehicle surrounding confirming controller 3, and the names do not limit physical components.

Figure 6:
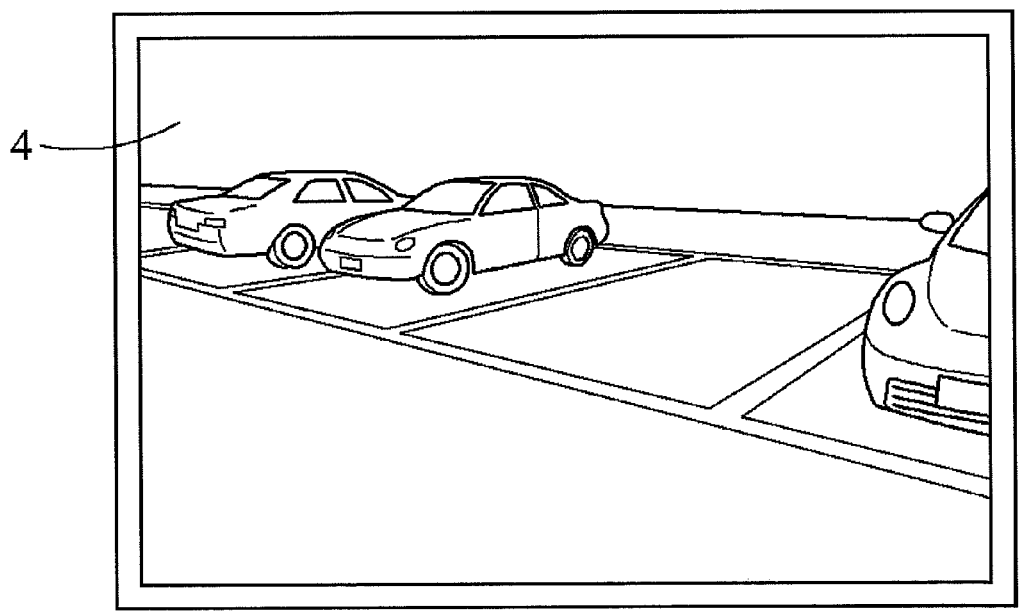
FIG. 6 is a schematic view illustrating a narrow-field-of-view image extracted from the captured wide-field-of-view image.
Figure 7:
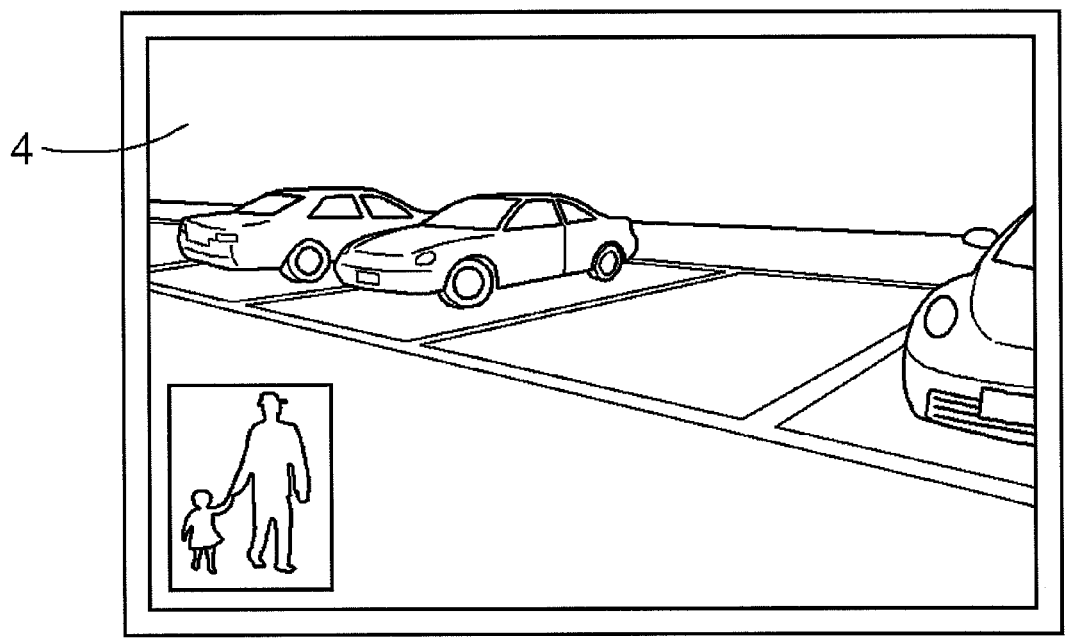
FIG. 7 is a schematic view illustrating a monitor display displaying the narrow-field-of-view image and an obstacle image.

In a case where the obstacle is recognized, the display image generating portion 36 generates a display image from the narrow-field-of-view image, which is generated by the narrow-field-of-view image generating portion 32, and then outputs the generated display image into a display control portion 40. Subsequently, the display control portion 40 transmits signals of the display image in real time to the monitor 4, and thereby a monitor screen, shown in FIG. 6, is displayed on the monitor 4. In a case where the obstacle, which is recognized by the obstacle recognizing portion 33, is determined to be included within the wide-field-of-view image but not included within the narrow-field-of-view image, the display image generating portion 36 generates a display image, in which the obstacle image, extracted by means of the obstacle image extracting portion 33, is superimposed on the narrow-field-of-view image. A monitor screen, showing such display image, is shown in FIG. 7. Further, the display image generating portion 36 mirror-reverses the display image at the time of generating the display image, so that a left-right positional relationship of the display image shown on the monitor 4 corresponds to that of an image shown on the rear-view mirror 5.

When the obstacle image is superimposed on the narrow-field-of-view image, in a case where the obstacle exists in the captured image on a left side of the narrow-field-of-view image, the obstacle image is arranged on a left side of the monitor screen. Likewise, in a case where the obstacle exists in the captured image on a right side of the narrow-field-of-view image, the obstacle image is arranged on a right side of the monitor screen. Further, in a case where the obstacle exists in the captured image on an upper side of the narrow-field-of-view image, the obstacle image is arranged on an upper side of the monitor screen. Accordingly, the driver may acknowledge in which direction relative to the driver the obstacle exists.

Figure 8:
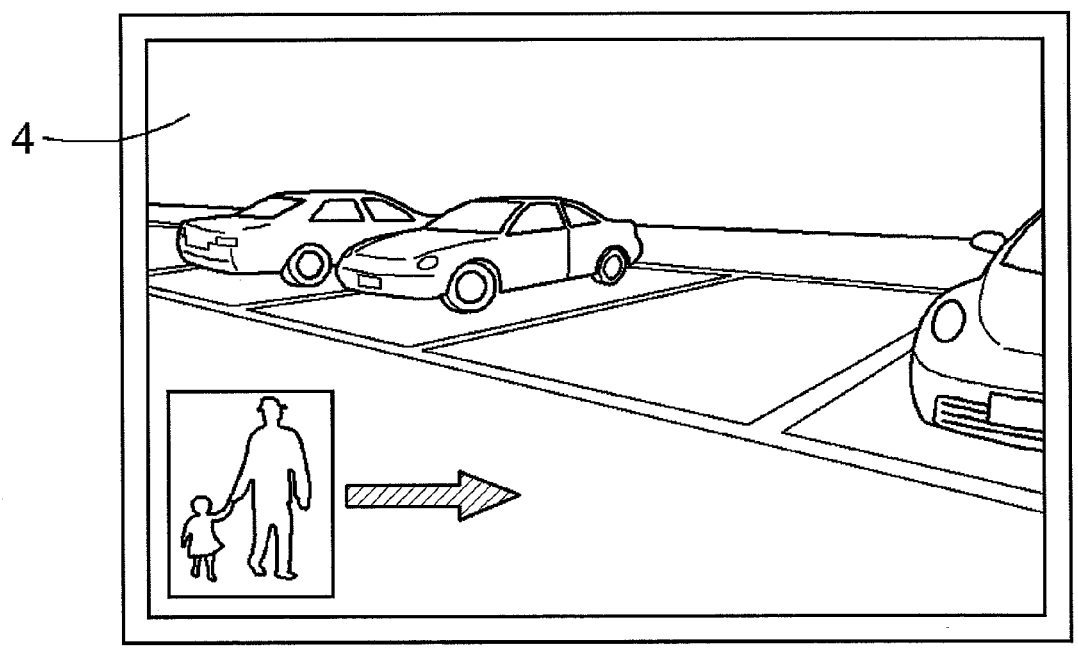
FIG. 8 is a schematic view illustrating a monitor display displaying the narrow-field-of-view image and the obstacle image together with an arrow serving as a directional sign.

The obstacle image is displayed on the monitor 4 in a manner illustrated in FIG. 7. Accordingly, the driver may realize that an object, which may obstruct the driving of the vehicle 1, exists at the outside of a normal monitor field (i.e., the narrow-field-of-view image). Consequently, the driver may physically look at an area surrounding the vehicle 1 (according to the embodiment, the driver may physically look at the rear of the vehicle 1) in order to directly look at the obstacle. Further, an approaching direction of the obstacle relative to the vehicle 1, may be obtained from the obstacle information transmitted from the obstacle recognizing portion 33, and then a sign illustrating the approaching direction of the obstacle may be displayed on the monitor 4. As illustrated in FIG. 8, an arrow may be used as the sign so as to increase visibility.

Figure 9:
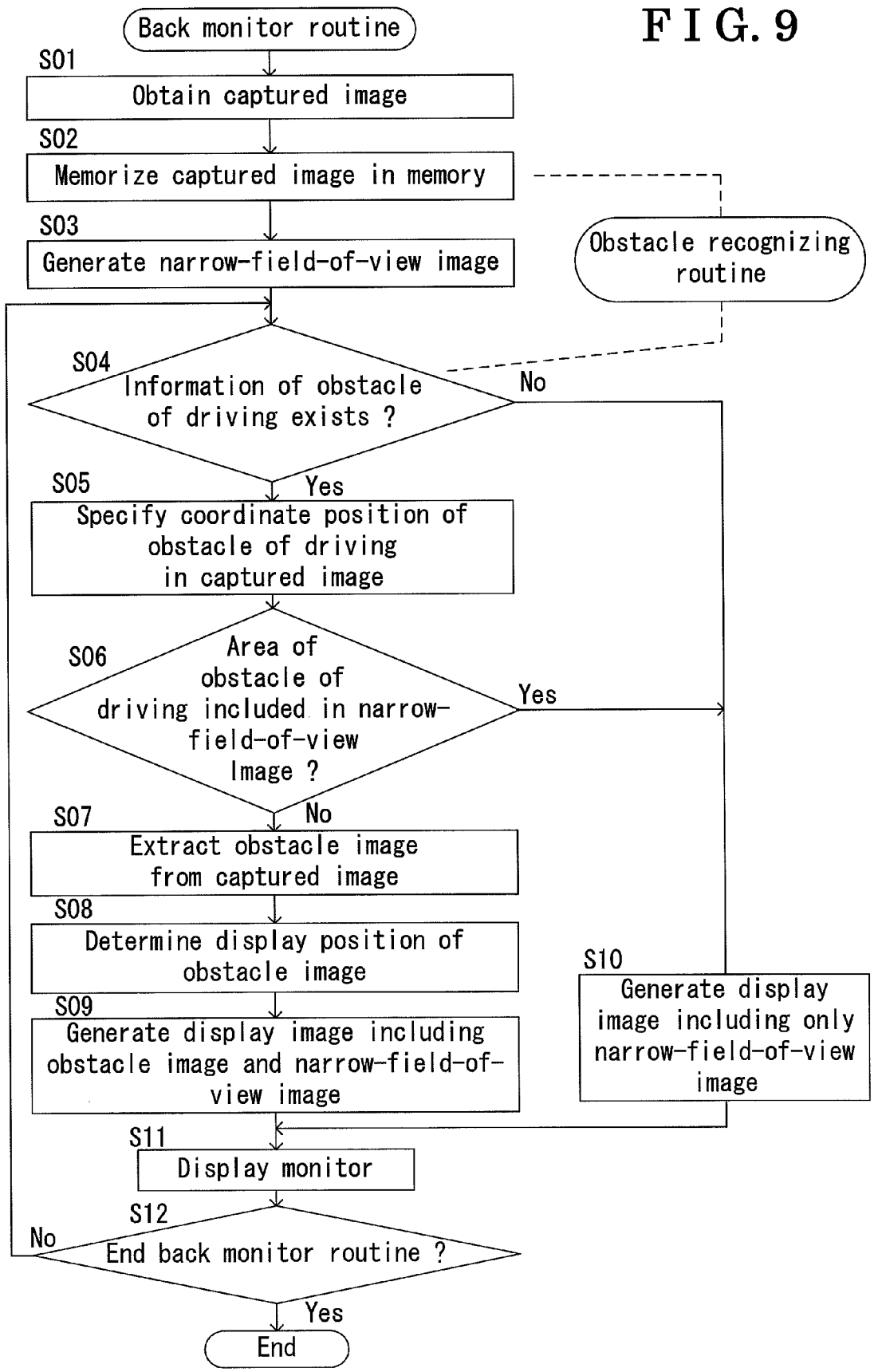
FIG. 9 is a flow chart illustrating an example of a back monitor routine executed in the vehicle surrounding confirmation apparatus.

An example of controlling of a back monitor routine for confirming the rear of the vehicle 1 according to the vehicle surrounding confirmation apparatus will be described hereinafter with reference to a flow chart shown in FIG. 9. When the back monitor routine is started, the images (the wide-field-of-view images) are captured by the camera 2 so as to obtain the captured images (S01). The captured images are sequentially memorized in the memory 31 temporarily for a predetermined time frame (S02). The memorized captured images are also used in an obstacle recognizing routine, which is executed simultaneously. A known algorithm for recognizing a relatively-moving object (i.e., the obstacle when the object approaches the vicinity of a course of the vehicle 1) based on the captured images, which are obtained temporally in succession, is used. Therefore, a detailed description will not be provided.

The narrow-field-of-view image generating portion 32 extracts an image from the captured images, which are memorized in the memory 31, using the predetermined extracting frame 91 (S03), thereby generating the narrow-field-of-view image. While the narrow-field-of-view image is generated, an image processing, such as a distortion correction, a resolution conversion, a level adjustment, is executed. Subsequently, whether or not the obstacle information is outputted from the obstacle recognizing portion 33 is checked (SO4). When the obstacle information is outputted, a coordinate position of the obstacle in the captured image is read from the obstacle information (S05). In a case where only a coordinate position according to a different coordinate system (for example, a world coordinating system) is included in the obstacle information, the coordinate is converted by means of the obstacle recognizing portion 33 in order to calculate a coordinate position of an area occupied by the obstacle in the captured image. Subsequently, the determining portion 34 checks whether or not the obstacle area, specified in the captured image, is included within an area of the narrow-field-of-view image (i.e., whether or not the obstacle recognized by the obstacle recognizing portion 33 may be visually recognizable in the narrow-field-of-view image) (S06). In order to achieve a high visibility of the obstacle, the determining portion 34 may determine that the obstacle area is not included within the narrow-field-of-view image when the obstacle area, specified in the captured image, is partially or entirely positioned at the outside of the area of the narrow-field-of-view image. When the obstacle area is determined so as not to be included within the area of the narrow-field-of-view image (S06 No branch), the obstacle extracting portion 35 extracts the obstacle area from the captured image as the obstacle image (S07). A display position of the extracted obstacle image on the monitor 4 is determined based on the position of the obstacle relative to the vehicle 1 (S08). Then, the display image is generated by means of the display image generating portion 36 (S09). For example, when the obstacle is positioned at a rear-right side of the vehicle 1, the display image is generated so as to superimpose the obstacle image on the narrow-field-of-view image at a right side of the monitor screen.

When the obstacle information is determined so as not to be outputted in the checking of step S04 (S04 No branch), the display image generating portion 36 generates the display image including only the narrow-field-of-view image (S10). Further, when the obstacle area is determined so as to be included within the area of the narrow-field-of-view image in the checking of step S06 (S06 Yes branch), the obstacle image is not necessary to be extracted from the captured image. Therefore, the display image generating portion 36 generates the display image only including the narrow-field-of-view image (S10).

The display image, generated by the display image generating portion 36, is transmitted to the display control portion 40, and thereby a screen corresponding to the display image is shown on the monitor 4. Further, whether or not a command for canceling the back monitor routine is inputted is checked in step S12. As long as the back monitor routine is continued (S12 No branch), a process returns to step S03 so as to generate the narrow-field-of-view image from the latest captured image, and then the aforementioned process is repeated.

Modified Embodiment

The extracting frame 91 for extracting the narrow-field-of-view image from the captured wide-field-of-view image may be set according to a selection of the driver. Accordingly, a field of view of a rear image displayed on the monitor screen, which is used as an alternative of the rear-view mirror 5, or as an auxiliary of the rear-view mirror 5, may be modified.

A displaying manner of the obstacle image and the narrow-field-of-view image may be modified. According to the above-described embodiment, the obstacle image is superimposed on the narrow-field-of-view image. Alternatively, each of the narrow-field-of-view image and the obstacle image may be arranged next to each other. Further, the narrow-field-of-view image and the obstacle image may be alternately displayed every predetermined time frame. Furthermore, the narrow-field-of-view image and the obstacle image may be processed by alpha-blending (translucent-blending) so that both of the narrow-field-of-view image and the obstacle image may be visually recognized.

A display mode may be included, in which even when the obstacle area is determined to be included within the area of narrow-field-of-view image, the obstacle image may be extracted, and then the obstacle image may be displayed together with the narrow-field-of-view image as an enlarged image of the obstacle.

According to the above-described embodiment, a back camera, serving as the image capturing portion 2, is applied in order to capture the images of the rear of the vehicle 1. Alternatively, a camera for capturing images of sides of the vehicle 1, or a camera for capturing images of a forward of the vehicle 1 may be selectively or additionally applied as the image capturing portion 2 in order to selectively confirm the surrounding of the vehicle 1.

According to the above-described embodiment, every obstacle, existing at the outside of the narrow-field-of-view image, is displayed on the monitor 4 as the obstacle image. However, when the moving direction of the obstacle (i.e., the approaching direction of the obstacle relative to the vehicle 1) is recognizable by means of the obstacle recognizing portion 33, only the obstacle image of the obstacle, which is approaching the vehicle 1, may be displayed on the monitor 4.

Accordingly, while the narrow-field-of-view image is being displayed on the monitor 4 for the vehicle surrounding confirmation, the obstacle recognition process is being executed by the obstacle recognizing portion 33. When the obstacle, recognized by the obstacle recognizing portion 33, is determined so as not to be included within the area of the narrow-field-of-view image, the area, in which the image of the obstacle is captured, is extracted from the captured image as the obstacle image. The extracted obstacle image is displayed on the monitor 4 individually or together with the narrow-field-of-view image. Accordingly, when the driver realizes that the obstacle exists at the outside of the narrow-field-of-view area, which the driver normally confirms, the driver may perform a danger avoiding action in advance. For example, the driver may directly look at the area of the obstacle. Further, according to the embodiment, the driver may only confirm the narrow-field-of-view area, which is the most important area, through the monitor 4 at a normal time. Therefore, compared to a method, in which a driver confirms the wide-field-of-view area through a monitor at a normal time, visibility is improved. Accordingly, both of the image, displayed on the monitor 4 normally, and the obstacle image, displayed on the monitor 4 when the obstacle is detected, are generated based on an appropriate capturing field of view. As a result, the driver may effectively realize an existence of the obstacle, without requiring cost increase.

According to the embodiment, the obstacle image is superimposed on the narrow-field-of-view image in the display image.

Accordingly, the driver, who is looking at the narrow-field-of-view image displayed on the monitor 4 in order to confirm the vehicle surrounding, may also look at the obstacle image through the same monitor 4. Therefore, the driver may perform the danger avoidance action preparatory at an appropriate timing.

According to the embodiment, an orientation of the obstacle relative to a position of the narrow-field-of-view image is calculated, and the obstacle image is arranged at a position of the narrow-field-of-view image corresponding to the calculated orientation, in the display image.

Accordingly, the driver may intuitively realize in which side the obstacle exists at the area the driver has been looking at.

It may be important for the driver to intuitionally realize that the obstacle, existing at the outside of the narrow-field-of-view area (i.e., generally, at an outside of a predictable driving course of the vehicle 1), is less likely to obstruct the driving of the vehicle 1 when the obstacle is moving away from the vehicle 1 than when the obstacle is approaching the vehicle 1.

Therefore, according to the embodiment, the sign showing an approaching direction of the obstacle is displayed together with the obstacle image in the display image.

Accordingly, the moving direction of the obstacle may be easily obtained when the aforementioned object detection algorithm, such as the optical flow method, the background differentiation method, a motion vector method and the like is applied for recognizing the obstacle.

According to the embodiment, the sign is an arrow.

According to the embodiment, the obstacle recognizing portion 33 executes an image processing relative to the captured image, thereby recognizing the obstacle.

Accordingly, the obstacle may be recognized, using the object detection algorithm, such as the optical flow method, the background differentiation method, the motion vector method and the like. Because the recognition of the obstacle may be executed, using the captured images obtained for the monitor display, additional captured images for the recognition of the obstacle may not be necessarily provided. Further, because recognition of the obstacle and determination of the position of the obstacle are executed based on the captured images, the determined position of the obstacle may be directly used in the captured image displayed on the monitor 4. Furthermore, when the motion vector of the vehicle is obtained, the moving direction of the obstacle may be calculated.

According to the embodiment, the obstacle image and the narrow-field-of-view image are arranged next to each other in the display image.

According to the embodiment, the display image generating portion 36 generates an image by translucent-blending the obstacle image and the narrow-field-of-view image, thereby outputting the generated image as the display image to the monitor 4.

According to the embodiment, the image capturing portion 2 is a camera capturing an image of a rear of the vehicle 1.

According to the embodiment, the display image generating portion 36 outputs the display image to the monitor 4 so that the obstacle image and the narrow-field-of-view image are displayed alternately.

According to the embodiment, the display image generating portion 36 outputs the display image to the monitor 4 so that the display image is switched from the narrow-field-of-view image to the obstacle image when the obstacle, recognized by the obstacle recognizing portion 33, is not determined to be included within the narrow-field-of-view image, based on the determination result of the determining portion 34.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle surrounding confirmation apparatus comprising:
a narrow-field-of-view image generating portion generating a narrow-field-of-view image, showing a portion of a vehicle surrounding, from a captured image of the vehicle surrounding obtained by an image capturing portion;
an obstacle recognizing portion recognizing an obstacle existing at the vehicle surrounding;
a determining portion determining whether or not the obstacle, recognized by the obstacle recognizing portion, is included within the narrow-field-of-view image;
an obstacle image extracting portion extracting an area, in which an image of the obstacle is shown, from the captured image as an obstacle image, when the obstacle, recognized by the obstacle recognizing portion, is not determined to be included within the narrow-field-of-view image, based on a determination result of the determining portion; and a display image generating portion generating a display image from the narrow-field-of-view image and the obstacle image, thereby outputting the generated display image to a monitor.

2. The vehicle surrounding confirmation apparatus according to claim 1, wherein the obstacle image is superimposed on the narrow-field-of-view image in the display image.

3. The vehicle surrounding confirmation apparatus according to claim 2, wherein an orientation of the obstacle relative to a position of the narrow-field-of-view image is calculated, and the obstacle image is arranged at a position of the narrow-field-of-view image corresponding to the calculated orientation, in the display image.

4. The vehicle surrounding confirmation apparatus according to claim 3, wherein a sign showing an approaching direction of the obstacle is displayed together with the obstacle image in the display image.

5. The vehicle surrounding confirmation apparatus according to claim 4, wherein the sign is an arrow.

6. The vehicle surrounding confirmation apparatus according to claim 1, wherein the obstacle recognizing portion executes an image processing relative to the captured image, thereby recognizing the obstacle.

7. The vehicle surrounding confirmation apparatus according to claim 1, wherein the obstacle image and the narrow-field-of-view image are arranged next to each other in the display image.

8. The vehicle surrounding confirmation apparatus according to claim 1, wherein the display image generating portion generates an image by translucent-blending the obstacle image and the narrow-field-of-view image, thereby outputting the generated image as the display image to the monitor.

9. The vehicle surrounding confirmation apparatus according to claim 1, wherein the image capturing portion is a camera capturing an image of a rear of the vehicle.

10. A vehicle surrounding confirmation apparatus comprising:
   a narrow-field-of-view image generating portion generating a narrow-field-of-view image, showing a portion of a vehicle surrounding, from a captured image of the vehicle surrounding obtained by an image capturing portion;
   an obstacle recognizing portion recognizing an obstacle existing at the vehicle surrounding;
   a determining portion determining whether or not the obstacle, recognized by the obstacle recognizing portion, is included within the narrow-field-of-view image;
   an obstacle image extracting portion extracting an area, in which an image of the obstacle is shown, from the captured image as an obstacle image, when the obstacle, recognized by the obstacle recognizing portion, is not determined to be included within the narrow-field-of-view image, based on a determination result of the determining portion; and
   a display image generating portion generating a display image, thereby outputting the generated display image, to a monitor, wherein
   the display image generating portion generates the display image from the obstacle image, thereby outputting the generated display image to the monitor, when the obstacle, recognized by the obstacle recognizing portion, is not determined to be included within the narrow-field-of-view image, based on a determination result of the determining portion.

11. The vehicle surrounding confirmation apparatus according to claim 10, wherein the display image generating portion outputs the display image to the monitor so that the obstacle image and the narrow-field-of-view image are displayed alternately.

12. The vehicle surrounding confirmation apparatus according to claim 10, wherein
   the display image generating portion outputs the display image to the monitor so that the display image is switched from the narrow-field-of-view image to the obstacle image when the obstacle, recognized by the obstacle recognizing portion, is not determined to be included within the narrow-field-of-view image, based on the determination result of the determining portion.

13. A vehicle surrounding confirmation apparatus comprising:
   a narrow-field-of-view image generating portion generating a narrow-field-of-view image, showing a portion of a vehicle surrounding, from a captured image of the vehicle surrounding obtained by an image capturing portion;
   an obstacle recognizing portion recognizing an obstacle existing at a portion of the vehicle surrounding and at an outside of an area of the narrow-field-of-view image;
   an obstacle image extracting portion extracting an area, in which an image of the obstacle is shown, from the captured image as an obstacle image, when the obstacle is recognized by the obstacle recognizing portion; and
   a display image generating portion generating a display image from the narrow-field-of-view image and the obstacle image, thereby outputting the generated display image to a monitor.

* * * * *